United States Patent
Cheng et al.

(10) Patent No.: US 12,269,058 B2
(45) Date of Patent: Apr. 8, 2025

(54) BOARD EDGE CASTING PROCESS AND APPLICATION THEREOF

(71) Applicant: Jianping Cheng, Jinhua (CN)

(72) Inventors: Jianping Cheng, Jinhua (CN); Shuhong Lin, Jinhua (CN)

(73) Assignee: Jianping Cheng, Jinhua (CN)

(*) Notice: Subject to any disclaimer, the term of this patent is extended or adjusted under 35 U.S.C. 154(b) by 0 days.

(21) Appl. No.: 18/009,748

(22) PCT Filed: Jun. 15, 2021

(86) PCT No.: PCT/CN2021/100116
§ 371 (c)(1),
(2) Date: Dec. 12, 2022

(87) PCT Pub. No.: WO2021/254329
PCT Pub. Date: Dec. 23, 2021

(65) Prior Publication Data
US 2023/0241800 A1 Aug. 3, 2023

(30) Foreign Application Priority Data

Jun. 17, 2020 (CN) .......................... 202010554243.5
Aug. 19, 2020 (CN) .......................... 202010839725.5

(51) Int. Cl.
*B05D 5/00* (2006.01)
*B27D 5/00* (2006.01)
(Continued)

(52) U.S. Cl.
CPC ................ *B05D 5/00* (2013.01); *B27D 5/003* (2013.01); *B29D 7/00* (2013.01); *B33Y 80/00* (2014.12)

(58) Field of Classification Search
CPC ..................................................... B05D 5/00
See application file for complete search history.

(56) References Cited

U.S. PATENT DOCUMENTS

| | | | |
|---|---|---|---|
| 6,635,202 B1 | 10/2003 | Bugg et al. | |
| 2009/0297760 A1* | 12/2009 | Arnoldt | B05D 7/08 |
| | | | 428/512 |
| 2019/0325850 A1* | 10/2019 | Soga | G10D 3/02 |

FOREIGN PATENT DOCUMENTS

| CN | 101126260 A | 2/2008 |
|---|---|---|
| CN | 101407069 A | 4/2009 |

(Continued)

OTHER PUBLICATIONS

Machine translation of EP 3517419 via EPO (Year: 2019).*
(Continued)

*Primary Examiner* — Kelly M Gambetta
*Assistant Examiner* — Mohammad Mayy
(74) *Attorney, Agent, or Firm* — Hemisphere Law, PLLC; Zhigang Ma

(57) ABSTRACT

An edge-casting process for sheet materials according to the present invention includes the following steps: S1. grooving, that is to choose a suitable sheet material, and leave a processing margin on the peripheral edge of the sheet, material, so as to make a first groove; S2. casting or covering, that is to cast a high solid content coating material into said first groove and solidify it; S3. making a second groove on the back of said first groove of the sheet material, and casting a high solid content coating material into said second groove and solidify it; and S4. milling and chamfering, that is to chamfer the sheet material according to a required processing margin, then perform an edge-casting process. An objective of the present invention aims to simplify processes, improve production efficiency, upgrade edge banding performance, greatly enhance the waterproofness, super hardness, anti-friction, collision resistance and adhesion of sheet materials, and dramatically extend the service life of sheet materials, therefor we provide an edge-casting process for sheet materials and its application (Continued)

capable of producing cast edges of variously-shaped sheet materials and suitable for the production of diverse sheet materials.

7 Claims, 13 Drawing Sheets

(51) Int. Cl.
*B29D 7/00* (2006.01)
*B33Y 80/00* (2015.01)

(56) References Cited

FOREIGN PATENT DOCUMENTS

| CN | 201920147 | A | | 8/2011 | |
| CN | 105473294 | A | | 4/2016 | |
| CN | 106217570 | A | * | 12/2016 | ............... B05D 7/06 |
| CN | 210173797 | A | | 3/2020 | |
| CN | 111945975 | | | 11/2020 | |
| EP | 3517419 | A1 | * | 7/2019 | ............... B32B 3/08 |
| JP | 2001269907 | A | * | 10/2001 | |
| WO | 7900904 | A | | 11/1979 | |
| WO | WO-2006010342 | A1 | * | 2/2006 | ........... A47B 96/202 |
| WO | 2012128723 | A | | 9/2012 | |

OTHER PUBLICATIONS

JP2001269907A English Translation, Iwaki, (Year: 2001).*
WO2006010342A1 English Translation, Zang, (Year: 2006).*
CN106217570A English Translation, Cheng, (Year: 2016).*

* cited by examiner

BOARD EDGE CASTING PROCESS AND APPLICATION THEREOF

FIELD OF THE INVENTION

The present invention pertains to the technical field of edge banding for sheet materials, specifically relates to an edge-casting process for sheet materials and its application.

BACKGROUND OF THE INVENTION

The edge banding for sheet materials, especially man-made boards and chipboards, is usually processed with solid edging strips, wooden strips and PVC hard and soft plastics, which are pressed together and sealed along edges by means of gluing technology, but the sheet material banded under the above edge banding process has weak waterproofness and durability, so its band may easily fall off due to collision or water immersion, and it is even more difficult to perform edge banding on a curve-shaped board.

In the prior art, in order to solve this technical problem, people have invented cast-molded edge banding, wherein glass fiber reinforced plastics is cast on the edge of a wood product and can be closely bonded to the wood without the use of adhesives, free of delamination, so it can be used to perform edge banding on the sheet material such as chipboards and multilayer boards and, reduce the amount of glue applied to man-made boards and the amount of forming aldehyde emitted therefrom. The arris molded on the sealed edge is smooth and rounded, hard and resistant to impact, improving the durability of furniture.

The cast-molded edge banding can make a fully-enclosed coating, which avoids the gaps that occur during typical edge bonding, achieves a fully-enclosed application, provides more overall protection for furniture and has superior water and corrosion resistance, moreover enables the product to be integrated and more beautiful. In addition, the cast-molded edge banding technology has a high degree of mechanization, capable of large scale industrialization and reduction of labor costs.

However, the cast-molded edge banding needs a number of processes to be carried out on the object to be molded, including: opening a casting hole, then heating and solidifying after casting, next repairing, grinding and beautifying, so the whole procedure is complex, time-consuming and labor-intensive and the object cannot be processed under streamlined operation and with fine machining of CNC machines. In addition, it is necessary for a large object to divide it into several pieces for cast-molded edge banding. When the objects needed to be processed with the cast-molded edge banding have different shapes, it is necessary to arrange a number of different molds, which cost a lot and take up a lot of space. Moreover, the unbalanced stress within the product proceed with the cast-molded edge banding easily results in deformation and cracking to varying degree.

The cast-molded edge banding does not allow for fine machining nor meet the high quality requirements of sheet materials. In the prior art, in order to solve this technical problem, it needs multi-layer spraying and sandpapering-flattening to obtain the sheet material according with a high quality requirement, by such a process it is time-consuming and labor-intensive, difficult for industrial production.

In addition, in the prior art, a melamine veneer is made by bonding a substrate with a veneer surface, among them, the substrate is typically selected form chipboards, medium fiber boards or multi-layer solid wood, and the veneer surface is firstly treated via processes of fire-resistant, abrasion-resistant and waterproofness soaking, next formed via the processes of hot pressing, dipped glue melting and solidifying directly following the process of soaking a triamine paper with glue. For the melamine veneer has the properties of hard surface, good abrasion resistance, rich color and heat resistance, as well as can prevent burning to some degree, it is currently employed in a large number of wood products in the decorative industry.

However, it is necessary for the melamine veneer currently in use first to polish its substrate, then spread its veneer surface on the substrate, further perform edge banding on the sides of the melamine veneer during use. Nowadays, plastic edge banding is generally used to process a cut notch, but it still has the following problem. 1. The edge banding strip and the substrate are made from different materials, still between those bonded together glue easily peels off; so that edge breakage easily occurs. 2. The plastic edge banding employs a method of matching the texture and color of the surface of the melamine veneer with transfer printing ink, but there is actually a heavy color difference between the edge banding trip and the veneer surface, so that their consistency is poor. 3. A concave-convex gap left following edge banding exists between the edge banding strip and the sealed mouth of the melamine veneer, so that it affects the integrity of products and furniture.

SUMMARY OF THE INVENTION

Technical Problem

The cast-molded, edge banding needs a number of processes to be carried out on the object to be molded, including: opening a casting hole, then heating and solidifying after casting, next repairing, grinding and beautifying, so the whole procedure is complex, time-consuming and labor-intensive and the object cannot be processed under streamlined operation and with fine machining of CNC machines. In addition, it is necessary for a large object to divide it into several pieces for cast-molded edge banding. When the objects needed to be processed with the cast-molded edge banding have different shapes, it is necessary to arrange a number of different molds, which cost a lot and take up a lot of space. Moreover, the unbalanced stress within the product proceed with the cast-molded edge banding easily results in deformation and cracking to varying degree.

The cast-molded edge banding does not allow for fine machining nor meet the high quality requirements of sheet materials. In the prior art, in order to solve this technical problem, it needs multi-layer spraying and sandpapering-flattening to obtain the sheet material according with a high quality requirement, by such, a process it is time-consuming and labor-intensive, difficult for industrial production.

However, it is necessary for the melamine veneer currently in use first to polish its substrate, then spread its veneer surface on the substrate, further perform edge banding on the sides of the melamine veneer during use. Nowadays, plastic edge banding is generally used to process a cut notch, but it still has the following problem. 1. The edge banding strip and the substrate are made from different materials, still between those bonded together glue easily peels off, so that edge breakage easily occurs. 2. The plastic edge banding employs a method of matching the texture and color of the surface of the melamine veneer with transfer printing ink, but there is actually a heavy color difference between the edge banding trip and the veneer surface, so that their consistency is poor. 3. A concave-convex gap left following edge banding exists between the edge banding strip and the sealed mouth of the melamine veneer, so that it affects the integrity of products and furniture.

Technical Solution

An objective of the present invention aims to simplify processes, improve production efficiency, upgrade edge banding performance, greatly enhance the waterproofness, super hardness, anti-friction, collision resistance and adhesion of sheet materials, and dramatically extend the service life of sheet materials, therefor we provide an edge-casting process for sheet materials and its application capable of producing cast edges of variously-shaped sheet materials and suitable for the production of diverse sheet materials.

In order to achieve the above objective, we provide an edge-casting process for sheet materials, which includes the following steps:

S1. grooving, that is to choose a suitable sheet material, and leave a processing margin on the peripheral edge of the sheet material, so as to make a first groove;

S2. casting or covering, that is to cast a high solid content coating material into the first groove and solidify it;

S3. making a second groove on the back of the first groove of the sheet material, and casting a high solid content coating material into the second groove and solidify it; and S4. milling and chamfering, that is to chamfer the sheet material according to a required processing margin, then perform an edge-casting process.

Further, the upper end face of the first groove is fairly wide, and the first groove is made with its upper end face close to one side of the sheet material.

Further, the upper end face of the second groove is fairly wide, and the second groove is made with its upper end face close to one side of the sheet material.

Further, in S2, after the high-solid content coating material is solidified, a surplus high-solid content coating material on the sheet material is sandpapered and flattened.

Further, in S3, after the high-solid content coating material is solidified, a surplus coating material on the sheet material is sandpapered and flattened.

Further, the high-solid content coating material is unsaturated resin.

Further, the sheet material is a man-made board, or solid wood board.

Another objective of the present invention aims to simplify processes, improve production efficiency, upgrade edge banding performance, greatly enhance the waterproofness, super hardness, anti-friction, collision resistance and adhesion of sheet materials of substrates, and dramatically extend the service life of melamine veneers, therefor we provide a production method and seamlessly-edged structure of melamine veneers capable of producing cast edges of variously-shaped substates and suitable for the production of diverse melamine veneers.

In order to achieve the above objective, the edge-casting process of the present invention is applied to the seamlessly-edged structure of melamine veneers, the edge is cast on the substrate of the melamine veneer, and then a veneer surface is spread on the melamine veneer after casting edges.

Further, after spreading veneer surfaces on the substrate of the melamine veneer and the surface of the cast edge, 3D printing is carried out to achieve a six-sided integration.

The seamlessly-edged structure of melamine veneers based on the above production method includes a substrate and a veneer surface spread on the substrate, the outer wall surface of the substrate is covered with a solidified high solid content coating material, the high solid content coating material has a thickness to form the cast edge of substrates, and the veneer surface is spread on the upper and lower surfaces of the substrate and the cast edge to form the seamlessly-edged structure of melamine veneers.

Further, the high-solid content coating material on the upper and lower edges of the outer periphery of the substrate has an outer end face wider than its inner end surface.

Further, the upper and lower edges of the outer periphery of the substrate are covered with a solidified high solid content coating material.

Further, the high-solid content coating material is unsaturated resin.

Further, after the veneer surface is spread on the substrate and the east edge, a six-sided integrated coating material is printed on the overall outer wall by means of 3D printing.

Beneficial Effect

Compared with the prior art, the present invention has the following beneficial effects.

1. The edge-casting process for sheet materials according the present invention does not needs a processing margin to be cut first, instead of a processing margin to be reserved, toward the side of which a first groove is made on the sheet material, according to the size requirements of sheet materials. The high solid content coating liquid is cast or brushed in the first groove, when the high solid content coating material is solidified in the first groove, it merges with the sheet material into integration. For sheet materials, casting edges enables their waterproofness performance and connection stability to greatly improve, especially for man-made boards, casting edges enables their quality to prominently rise, and their service life to increase by multiple.

2. For the edge-casting process for sheet materials according the present invention, using a processing margin as an outer frame of the cast edge of the sheet material enables the shape of sheet materials to diversify without arrangement of multiple molds, so it saves mold resources and dramatically diversifies the shape of sheet materials. Compared with the molding process, the cast edge free of molds on sheet materials according to the present invention has a simple process and high production efficiency, so it can be applied to a large-scale and multi-variety industrial production mode.

3. In the edge-casting process for sheet materials according to the present invention, the high solid content coating material is solidified in the first groove on the body of the sheet material, and merges with the sheet material into integration. Therefore, for the sheet material produced according to the process of the present invention, fine machining can be performed on the solidified high solid content, coating material, and the fine machining according to requirements enables the quality and precision of sheet materials to improve. Moreover, processing sheet materials under streamlined operation enables production efficiency to improve and production costs to further decrease.

4. Such arrangement as the upper end faces of the first groove and the second groove are wide, and the first groove and the second groove are made with their upper end faces close to one side of the sheet material, increases the contact area between the liquid phase of the high solid content coating material and the sheet material, and enhances the stability of the fusion connection and integration between the high solid content coating material and the sheet material.

5. In S2 and S3, after the high solid content coating material is solidified, sandpapering and flattening the surplus high solid content coating material enables the quality and precision of sheet materials to further improve.

The edge-casting process for sheet materials according to the present invention provides a novel and unique process, enabling both outer edge banding and inner edge banding for sheet materials, raising the production efficiency and having an good edge banding effect. After the high solid content coating material used for edge banding is solidified, it merges with the sheet material to form integration and actually achieve a seamless connection, overcoming the defects in the original man-made boards with loose edges and corners and the melamine veneer with fragile edges and corners, greatly enhancing waterproofness, super hardness, anti-friction, collision resistance and adhesion, and dramatically extending the service life of sheet materials, so it is capable of producing cast edges of variously-shaped sheet materials and suitable for diverse production.

Compared with the prior art, the application of the edge-casting process for sheet materials according to the present invention in melamine veneers and the seamlessly-edged structure of the melamine veneer produced in its application has the following beneficial effects.

1. The application of the edge-casting process for sheet materials according to the present invention in melamine veneers does not needs a processing margin to be cut first, instead of a processing margin to be reserved, toward the side of which a first groove is made on the substrate, according to the size requirements of melamine veneers. The high solid content coating liquid is cast or brushed in the first groove, when the high solid content coating material is solidified in the first groove, it merges with the substate into integration. For substrates, casting edges enables their waterproofness performance and connection stability to greatly improve, especially for man-made substrates, casting edges enables their quality to prominently rise, and their service life to increase by multiple.

2. For the application of the edge-casting process for sheet materials according to the present invention in melamine veneers, using a processing margin as an outer frame of the cast edge of substrates enables the shape of substrates to diversify without arrangement of multiple molds, so it saves mold resources and dramatically diversifies the shape of substrates. Compared with the molding process, the cast edge free of molds on the substrate according to the present invention has a simple process and high production efficiency, so it can be applied to a large-scale and multi-variety industrial production mode.

3. In the application of the edge-casting process for sheet materials according to the present invention in melamine veneers, the high solid content coating material is solidified in the first groove on the body of the substrate, and merges with the substrate into integration. Therefore, for the substrate produced according to the process of the present invention, fine machining can be performed on the solidified high solid content coating material, and the fine machining according to requirements enables the quality and precision of substrates to improve. Moreover, processing substrates under streamlined operation enables production efficiency to improve and production costs to further decrease.

4. Such arrangement as the upper end faces of the first groove and the second groove are wide, and the first groove and the second groove are made with their upper end faces close to one side of the substrate increases the contact area between the liquid phase of the high solid content coating material and the substrate, and enhances the stability of the fusion connection and integration between the high solid content coating material and the substrate.

5. In S2 and S3, after the high solid content coating material is solidified, sandpapering and flattening the surplus high solid content coating material enables the quality and precision of substrates to further improve.

6. The substrate with, the cast edges of melamine veneers produced in the application of the edge-casting process for sheet materials according to the present invention in melamine veneers and its surface are printed with color by means of 3D printing, so that the entire melamine veneer achieves a six-sided integration, greatly enhancing the quality of products.

The application of the edge-casting process for sheet materials according to the present invention in melamine veneers has a simple process, high production efficiency and a good edge-casting effect, dramatically raises the waterproofness performance, wear resistance and collision resistance of melamine veneers, and the cast edge therefrom being not easy to peel off enables the service life of melamine veneers to greatly extend, so the cast edge of melamine veneers is capable of forming various shapes according to requirements and suitable for diverse production.

where 1—substrate, 101—upper edge, 102—lower edge, 103—outer wall surface, 2—first groove, 3—second groove, 4—processing margin, 5—cast edge, 6—veneer surface.

DETAILED DESCRIPTION OF SOME EMBODIMENTS

Optimal Embodiment

Figure 1:
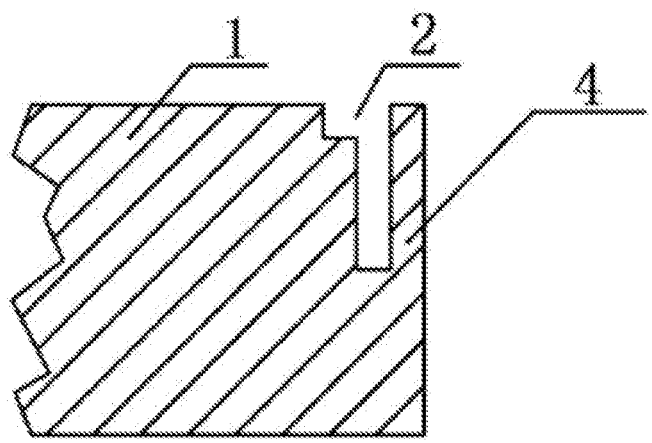
FIG. 1 shows a display drawing of S1 according to the present invention.
Figure 2:
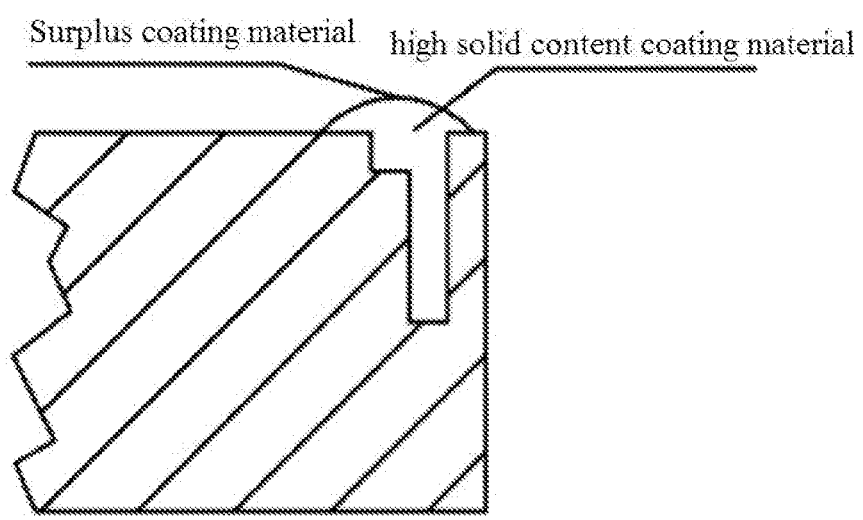
FIG. 2 shows a display drawing of S2 according to the present invention.
Figure 3:
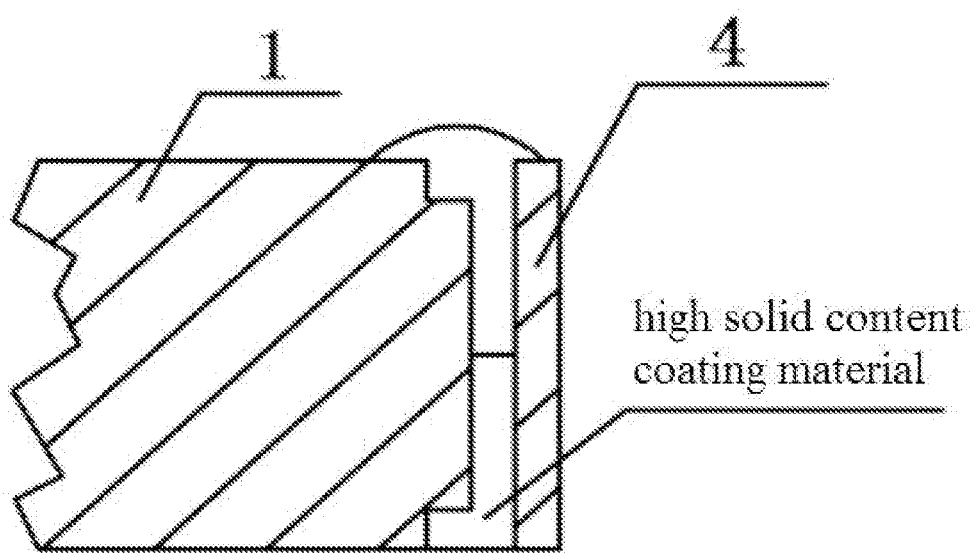
FIG. 3 shows a display drawing of S3 according to the present invention.
Figure 4:
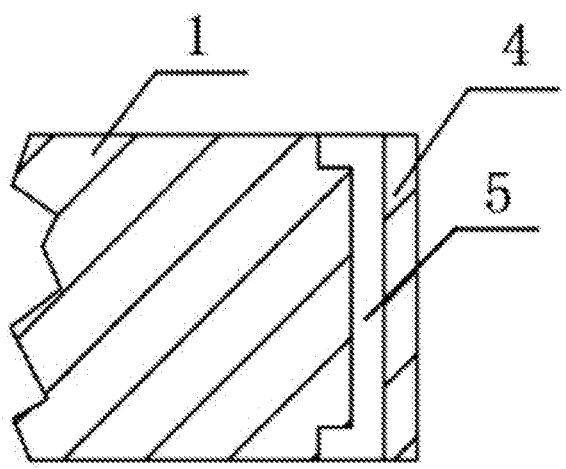
FIG. 4 shows a display drawing of S4 according to the present invention.
Figure 5:
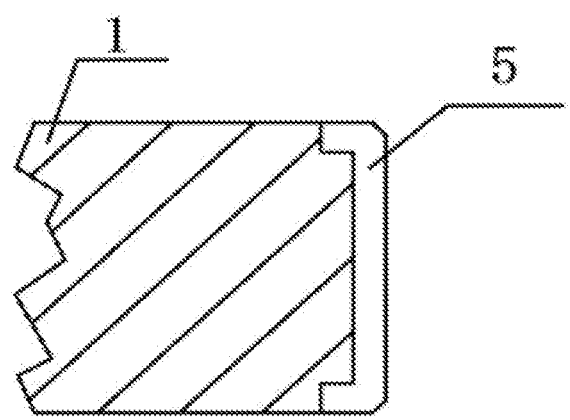
FIG. 5 shows a display drawing of S4 according to the present invention.
Figure 6:
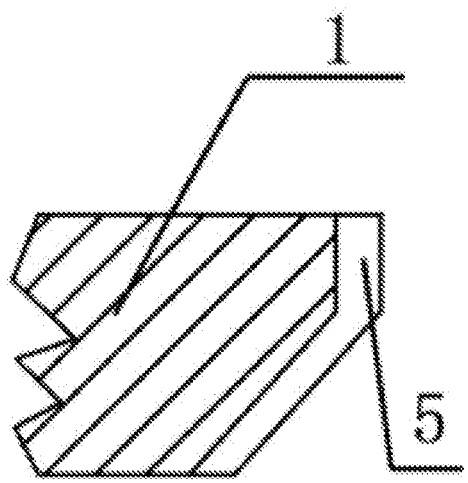
FIG. 6 is a schematic diagram 1 of the product including the boards with the cast edges according to the present invention.
Figure 7:
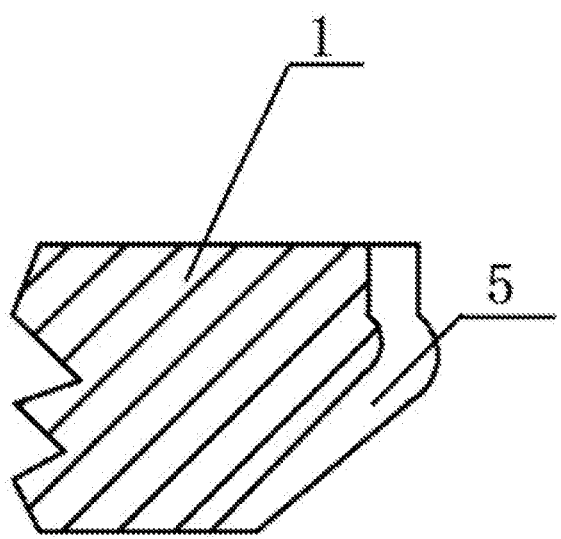
FIG. 7 is a schematic diagram 2 of the product including the boards with the cast edges according to the present invention.
Figure 8:
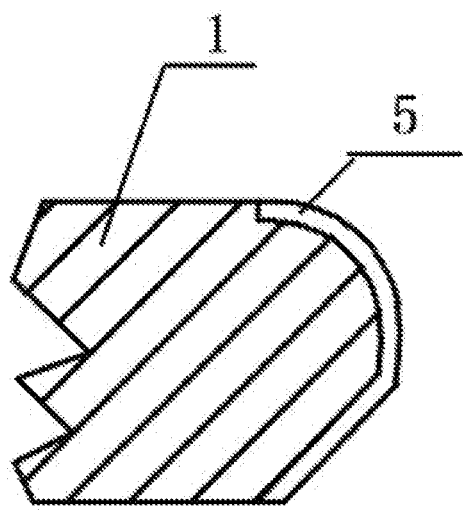
FIG. 8 is a schematic diagram 3 of the product including the boards with the cast edges according to the present invention.
Figure 9:
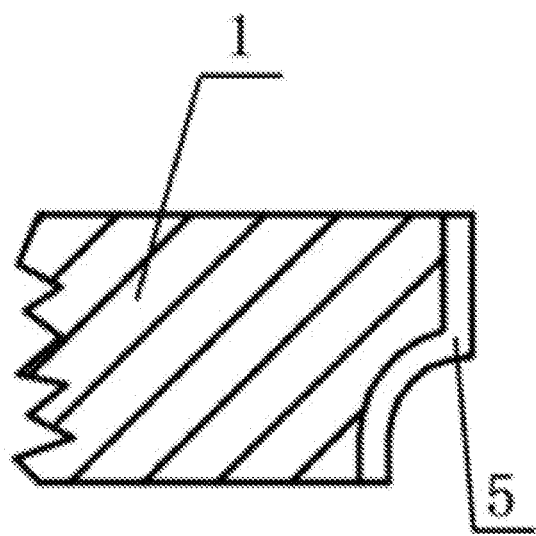
FIG. 9 is a schematic diagram 4 of the product including the boards with the cast edges according to the present invention.

An optimal embodiment of the present invention is shown in FIGS. 1-9.

The edge-casting process for sheet materials according to the present invention includes the following steps:

S1. grooving, that is to choose a suitable sheet material, and leave a processing margin on the peripheral edge of the sheet material, so as to make a first groove;

S2. casting or covering, that is to cast a high solid content coating material into the first groove and solidify it;

S3. making a second groove on the back of the first groove of the sheet material, and casting a high solid content coating material into the second groove and solidify it; and S4. milling and chamfering, that is to chamfer the sheet material according to a required processing margin, then perform an edge-casting process.

The edge-casting process for sheet materials according the present invention does not needs a processing margin to be cut first, instead of the processing margin 4 to be reserved, toward the side of which the first groove 2 is made on the sheet material 1, according to the size requirements of sheet materials. The high solid content coating liquid is cast or brushed in the first groove 2, when the high solid content coating material is solidified in the first groove 2, it merges with the sheet material 1 into integration. For sheet materials, casting edges enables their waterproofness performance and connection stability to greatly improve, especially for man-made boards, casting edges enables their quality to prominently rise, and their service life to increase by multiple.

For the edge-casting process for sheet materials according the present invention, using the processing margin 4 as an outer frame of the cast edge of the sheet material 1 enables the shape of sheet materials to diversify without arrangement of multiple molds, so it saves mold resources and dramatically diversifies the shape of sheet materials. Compared with the molding process, the cast edge free of molds on sheet materials according to the present invention has a simple process and high production efficiency, so it can be applied to a large-scale and multi-variety industrial production mode.

Moreover, for the edge-casting process for sheet materials according the present invention is to cast the edge directly on the sheet material, there are no limitations on the shape and size of sheet materials. Compared with the cast-molded edge banding, it is not necessary to cut a large sheet material, in any case the sheet material having a processing margin enables cast edges to directly be formed on variously-shaped sheet materials.

In the edge-casting process for sheet materials according to the present invention, the high solid content coating material is solidified in the first groove 2, and merges with the sheet material 1 into integration. Therefore, for the sheet material produced according to the process of the present invention, fine machining can be performed on the solidified high solid content coating material, and the fine machining according to requirements enables the quality and precision of sheet materials to improve. Moreover, processing sheet materials under streamlined operation enables production efficiency to improve and production costs to further decrease.

Such arrangement as the upper end faces of the first groove and the second groove are wide, and the first groove and the second groove are made with their upper end faces close to one side of the sheet material, increases the contact area between the liquid phase of the high solid content coating material and the sheet material 1, and enhances the stability of the fusion connection and integration between the high solid content coating material and the sheet material 1.

In S2 and S3, after the high solid content coating material is solidified, sandpapering and flattening the surplus high solid content coating material enables the quality and precision of sheet materials to further improve.

The high-solid content coating material is unsaturated resin. A process where a free radical copolymerization occurs to a viscous, flowable unsaturated polyester resin in the presence of an initiator, so as to produce a stable polymer structure, is called the solidification of unsaturated polyester, which merges with the sheet material 1 into integration due to its properties.

The edge-casting process for sheet materials according to the present invention can be applied to various sheet materials, especially when it is suitable for man-made boards, it can dramatically raise the service life of sheet materials and improve the quality and quality of sheet materials.

The edge-casting process for sheet materials according to the present invention can simplify processes, improve production efficiency, upgrade edge banding performance, greatly enhance the waterproofness, super hardness, anti-friction, collision resistance and adhesion of sheet materials, and dramatically extend the service life of sheet materials, so it is capable of producing cast edges of variously-shaped sheet materials and suitable for diverse production.

Finally, it should be noted that the above example is only a specific embodiment of the present invention. Obviously, the present invention is not limited to the embodiment, there may be many variations. All deformations that a person skilled in the art can directly derive from or associate with the content disclosed by the present invention shall be considered to fall within the protection scope of the present invention.

Detailed Embodiment

We shall further describe the present invention in combination with the drawings and examples as follows.

EXAMPLE 1

As shown in FIGS. 1-9, the edge-casting process for sheet materials according to the present invention includes the following steps:

S1. grooving, that is to choose a suitable sheet material, and leave a processing margin on the peripheral edge of the sheet material, so as to make a first groove;

S2. casting or covering, that is to cast a high solid content coating material into the first groove and solidify it;

S3. making a second groove on the back of the first groove of the sheet material, and casting a high solid content coating material into the second groove and solidify it; and S4. milling and chamfering, that is to chamfer the sheet material according to a required processing margin, then perform an edge-casting process.

The edge-casting process for sheet materials according the present invention does not needs a processing margin to be cut first, instead of the processing margin 4 to be reserved, toward the side of which the first groove 2 is made on the sheet material 1, according to the size requirements of sheet materials. The high solid content coating liquid is cast or brushed in the first groove 2, when the high solid content coating material is solidified in the first groove 2, it merges with the sheet material 1 into integration. For sheet materials, casting edges enables their waterproofness performance and connection stability to greatly improve, especially for man-made boards, casting edges enables their quality to prominently rise, and their service life to increase by multiple.

For the edge-casting process for sheet materials according the present invention, using the processing margin 4 as an outer frame of the cast edge of the sheet material 1 enables the shape of sheet materials to diversify without arrangement of multiple molds, so it saves mold resources and dramatically diversifies the shape of sheet materials. Compared with the molding process, the cast edge free of molds on sheet materials according to the present invention has a simple process and high production efficiency, so it can be applied to a large-scale and multi-variety industrial production mode.

Moreover, for the edge-casting process for sheet materials according the present invention is to cast the edge directly on the sheet material, there are no limitations on the shape and size of sheet materials. Compared with the cast-molded edge banding, it is not necessary to cut a large sheet material, in any case the sheet material having a processing margin enables cast edges to directly be formed on variously-shaped sheet materials.

In the edge-casting process for sheet materials according to the present invention, the high solid content coating material is solidified in the first groove 2, and merges with the sheet material 1 into integration. Therefore, for the sheet material produced according to the process of the present invention, fine machining can be performed on the solidified high solid content coating material, and the fine machining according to requirements enables the quality and precision of sheet materials to improve. Moreover, processing sheet materials under streamlined operation enables production efficiency to improve and production costs to further decrease.

Such arrangement as the upper end faces of the first groove and the second groove are wide, and the first groove and the second groove are made with their upper end faces close to one side of the sheet material, increases the contact area between the liquid phase of the high solid content coating material and the sheet material 1, and enhances the stability of the fusion connection and integration between the high solid content coating material and the sheet material 1.

In S2 and S3, after the high solid content coating material is solidified, sandpapering and flattening the surplus high solid content coating material enables the quality and precision of sheet materials to further improve.

The high-solid content coating material is unsaturated resin. A process where a free radical copolymerization occurs to a viscous, flowable unsaturated polyester resin in the presence of an initiator, so as to produce a stable polymer structure, is called the solidification of unsaturated polyester, which merges with the sheet material 1 into integration due to its properties.

The edge-casting process for sheet materials according to the present invention can be applied to various sheet materials, especially when it is suitable for man-made boards, it can dramatically raise the service life of sheet materials and improve the quality and quality of sheet materials.

The edge-casting process for sheet materials according to the present invention can simplify processes, improve production efficiency, upgrade edge banding performance, greatly enhance the waterproofness, super hardness, anti-friction, collision resistance and adhesion of sheet materials, and dramatically extend the service life of sheet materials, so it is capable of producing cast edges of variously-shaped sheet materials and suitable for diverse production.

Finally, it should be noted that the above example is only a specific embodiment of the present invention. Obviously, the present invention is not limited to the embodiment, there may be many variations. All deformations that a person skilled in the art can directly derive from or associate with the content disclosed by the present invention shall be considered to fall within the protection scope of the present invention.

EXAMPLE 2

Figure 10:
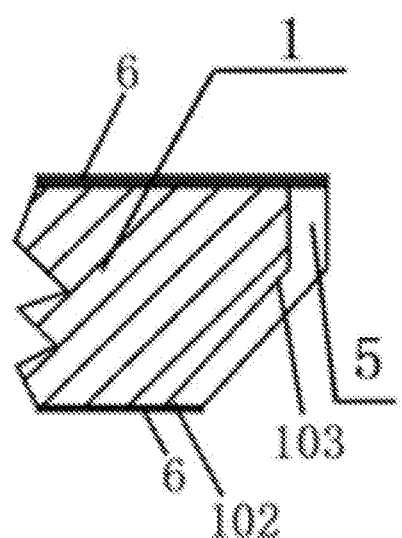
FIG. 10 is a structure diagram 1 of the application of the edge-casting process according to the present invention in melamine veneers.
Figure 11:
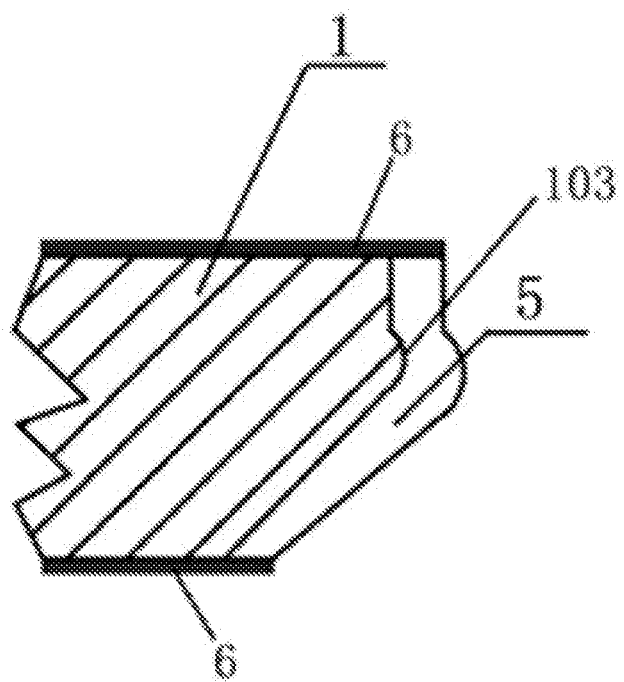
FIG. 11 is a structure diagram 2 of the application of the edge-casting process according to the present invention in melamine veneers.
Figure 12:
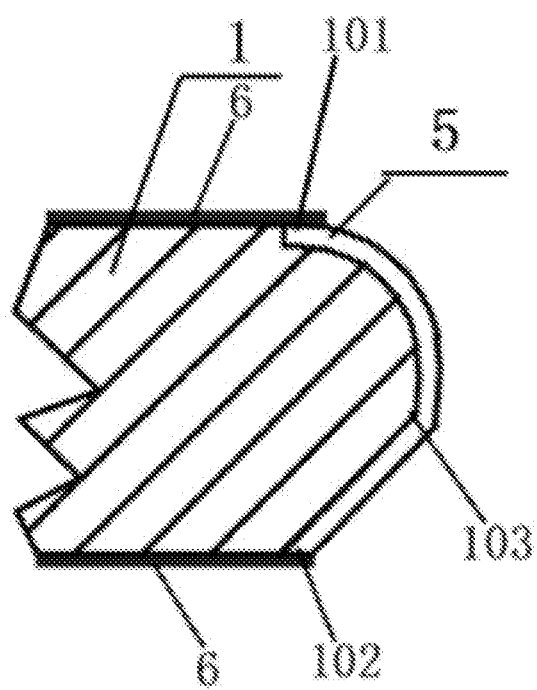
FIG. 12 is a structure diagram 3 of the application of the edge-casting process according to the present invention in melamine veneers.
Figure 13:
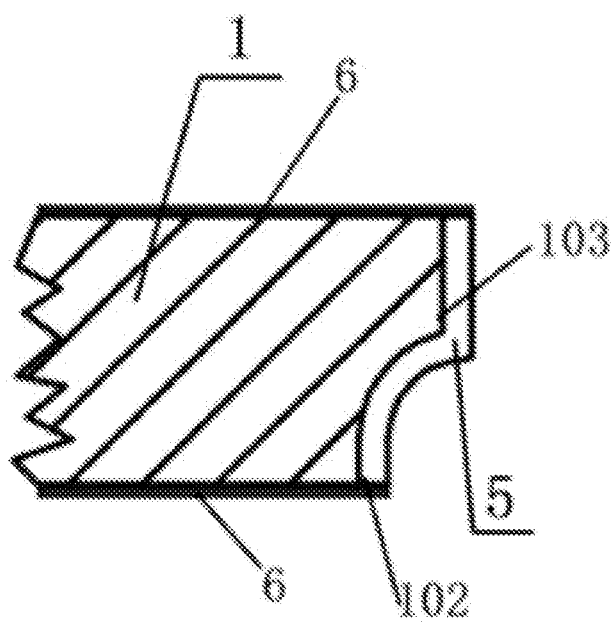
FIG. 13 is a structure diagram 4 of the application of the edge-casting process according to the present invention in melamine veneers.

As shown in FIGS. 1-5, and 10-13, in the application of the edge-casting process for sheet materials according to the present invention in melamine veneers, an edge is cast on the substrate of the melamine veneer, then a veneer surface is spread on the melamine veneer after casting edges.

S1. grooving, that is to choose a suitable substate, and leave a processing margin on the peripheral edge of the substate, so as to make a first groove;

S2. casting or covering, that is to cast a high solid content coating material into the first groove and solidify it;

S3. making a second groove on the back of the first groove of the substate, and casting a high solid content coating material into the second groove and solidify it;

S4. spreading a veneer surface on the substrate and the surface of the cast edge;

S5. milling and chamfering, that is to chamfer the substate according to a required processing margin, then form an seamless melamine veneer.

The application of the edge-casting process for sheet materials according to the present invention in melamine veneers does not needs a processing margin to be cut first, instead of the processing margin 4 to be reserved, toward the side of which the first groove 2 is made on the substrate 1, according to the size requirements of the substrate 1. The high solid content coating liquid is cast or brushed in the first groove 2, when the high solid content coating material is solidified in the first groove 2, it merges with the substrate 1 into integration. For substrates, casting edges enables their waterproofness performance and connection stability to greatly improve, especially for substrate of melamine veneers, casting edges enables their quality to prominently rise, and their service life to increase by multiple.

For the application of the edge-casting process for sheet materials according to the present invention in melamine veneers, using the processing margin 4 as an outer frame of the cast edge of substrates 1 enables the shape of substrates to diversify without arrangement of multiple molds, so it saves mold resources and dramatically diversifies the shape of substrates.

Compared with the molding process, the cast edge free of molds on the substrate according to the present invention has a simple process and high production efficiency, so it can be applied to a large-scale and multi-variety industrial production mode.

Moreover, for the application of the edge-casting process for sheet materials according to the present invention in melamine veneers is to cast the edge directly on the substrate, there are no limitations on the shape and size of the substrate. Compared with the cast-molded edge banding, it is not necessary to cut a large substrate, in any case the substrate having a processing margin enables cast edges to directly be formed on a variously-shaped substrate.

In the application of the edge-casting process for sheet materials according to the present invention in melamine veneers, the high solid content coating material is solidified in the first groove 2, and merges with the substrate 1 into integration. Therefore, for the substrate produced according to the process of the present invention, fine machining can be performed on the solidified high solid content coating material, and the fine machining according to requirements enables the quality and precision of substrates to improve. Moreover, processing substrates under streamlined operation enables production efficiency to improve and production costs to further decrease.

The cast edge of melamine veneers within the application of the present invention enables a face-to-face connection with the veneer surface, compared with the linear connection between the cast edge and the veneer surface, the face-to-face connection is more stable, and its performance of waterproofness and adhesion is better.

Such arrangement as the upper end faces of the first groove 2 and the second groove 3 are wide, and the first groove 2 and the second groove 3 are made with their upper end faces close to one side of the substrate 1 increases the contact area between the liquid phase of the high solid content coating material and the substrate 1, and enhances the stability of the fusion connection and integration between the high solid content coating material and the substrate 1. Spreading the veneer surface on the substrate of melamine veneers also enables the area of the veneer surface covering the cast edge of melamine veneers to increase, so that the edge of the veneer surface of melamine veneers is farther away from the substrate and the cast edge, and the substrate and the cast edge will not be exposed.

In S2 and S3, after the high solid content coating material is solidified, the surplus high solid content coating material is sandpapered and flattened, thus spreading the veneer surface on the surface of the substrate and the cast edge under high temperature and high pressure enables the veneer surface to fit more tightly and the quality and precision of the adhesion between the substrate and the veneer surface to further improve.

The high-solid content coating material is unsaturated resin. A process where a free radical copolymerization occurs to a viscous, flowable unsaturated polyester resin in the presence of an initiator, so as to produce a stable polymer structure, is called the solidification of unsaturated polyester, which merges with the substrate 1 into integration due to its properties.

The substrate with the cast edges of melamine veneers and its surface are printed with color by means of 3D printing, so that the entire melamine veneer achieves a six-sided integration, greatly enhancing the quality of products.

The application of the edge-casting process for sheet materials according to the present invention in melamine veneers can simplify processes, improve production efficiency, upgrade edge banding performance and greatly enhance waterproofness of substrates, so that the melamine veneer has super hardness, anti-friction, collision resistance and adhesion, and its service life is dramatically extend, so the application is capable of producing variously-shaped cast edges and suitable for diverse production.

As shown in FIGS. 10-13, the seamlessly-edged structure of melamine veneers based on the application of the edge-casting process for sheet materials according to the present invention in melamine veneers includes the substrate 1 and the veneer surface 6 spread on the substrate 1, the outer wall surface 103 of the substrate 1 is covered with a solidified high solid content coating material, the high solid content coating material form the cast edge 5, and the veneer surface 6 is spread on the upper and lower surfaces of the substrate 1 and the cast edge 5 to form the seamlessly-edged structure of melamine veneers.

In the seamlessly-edged structure of melamine veneers based on the application of the edge-casting process for sheet materials according to the present invention in melamine veneers, the high solid content coating material is directly solidified on the substrate 1, it merges with the substrate 1 into integration. For the substrate 1, casting edges enables its waterproofness performance and connection stability between the substrate 1 and the cast edge 5 to greatly rise, effectively avoiding the cast edge 5 from peeling off the substrate 1 of melamine veneers, dramatically enhancing the waterproof performance of the substrate and increasing the service life of melamine veneers by multiple.

For the seamlessly-edged structure of melamine veneers based on the application of the edge-casting process for sheet materials according to the present invention in melamine veneers, when the cast edge on the outside of the substrate 1 is solidified on the substrate 1, the shape of the cast edge of substrates making varied as needed enables the shape of the cast edge of substrates to greatly diversify, so it can be applied to a large-scale and multi-variety industrial production mode.

The high solid content coating material may solidified on the upper edge 101 or the lower edge 102 of the outer periphery of the substrate as needed to form variously-shaped cast edges.

The seamlessly-edged structure of melamine veneers based on the application of the edge-casting process for sheet materials according to the present invention in melamine veneers is to cast the edge directly on the substrate, there are no limitations on the shape and size of the substrate. Compared with the cast-molded edge banding, it is not necessary to cut a large substrate, in any case the substrate having a processing margin enables cast edges to directly be formed on a variously-shaped substrate.

For the seamlessly-edged structure of melamine veneers based on the application of the edge-casting process for sheet materials according to the present invention in melamine veneers, fine machining can be performed on the solidified high solid content coating material, and the fine machining according to requirements enables the quality and precision of substrates to improve. Moreover, processing substrates under streamlined operation enables production efficiency to improve and production costs to further decrease.

In the seamlessly-edged structure of melamine veneers based on the application of the edge-casting process for sheet materials according to the present invention in melamine veneers, the cast edge enables a face-to-face connection with the veneer surface 6, compared with the linear connection between the cast edge and the veneer surface 6, the face-to-face connection is more stable, and its performance of waterproofness and adhesion is better.

Such arrangement as the high-solid content coating material on the upper and lower edges of the outer periphery of the substrate has the outer end face wider than its inner end face, increases the contact area between the liquid phase of the high solid content coating material and the substrate 1, and enhances the stability of the fusion connection and integration between the high solid content coating material and the substrate 1, and the area of the veneer surface 6 covering the cast edge of melamine veneers also increases after shaping, so that the edge of the veneer surface 6 of melamine veneers is farther away from the substrate and the cast edge, and the cast edge will not be exposed.

The high-solid content coating material is unsaturated resin. A process where a free radical copolymerization occurs to a viscous, flowable unsaturated polyester resin in the presence of an initiator, so as to produce a stable polymer structure, is called the solidification of unsaturated polyester, which merges with the substrate 1 into integration due to its properties.

A coating is printed by 3D printing into a six-sided integration outside the substrate and the veneer surface 6 of the cast edge. Applying 3D printing on the substrate 1 of the cast edge of melamine veneers and its veneer surface 6 enables the entire melamine veneer to achieve a six-sided integration, greatly enhancing the quality of products.

The seamlessly-edged structure of melamine veneers based on the application of the edge-casting process for sheet materials according to the present invention in melamine veneers can simplify processes, improve production efficiency, upgrade edge banding performance and greatly enhance waterproofness of substrates, so that the melamine veneer has super hardness, anti-friction, collision resistance and adhesion, and its service life is dramatically extend, so the application is capable of producing variously-shaped cast edges and suitable for diverse production.

Finally, it should be noted that the above examples are only a specific embodiment of the present invention. Obviously, the present invention is not limited to the embodiment, there may be many variations. All deformations that a person skilled in the art can directly derive from or associate with the content disclosed by the present invention shall be considered to fall within the protection scope of the present invention.

INDUSTRIAL PRACTICALITY

The edge-casting process for sheet materials according to the present invention can simplify processes, improve production efficiency, upgrade edge banding performance, greatly enhance the waterproofness, super hardness, anti-friction, collision resistance and adhesion of sheet materials, and dramatically extend the service life of sheet materials, so it is capable of producing cast edges of variously-shaped sheet materials and suitable for diverse production, so it has industrial practicality.

The free content of the sequence table input the paragraphs described in the free content of the sequence table here.

What is claimed is:

1. An edge-casting process for sheet materials, comprising the following steps:
    S1. making a first groove in an upper side of a sheet material, wherein the sheet material includes a main body and a processing margin, the first groove is located between the main body and the processing margin;
    S2. casting or covering a high solid content coating material into said first groove and solidify it;
    S3. making a second groove in a lower side of the sheet material opposite to the upper side, and casting a high solid content coating material into said second groove and solidify it; wherein the second groove is communicated with the first groove and is located between the main body and the processing margin, and solidified coating material in the first groove and the second groove separates the processing margin from the main body; and
    S4. milling and chamfering the sheet material to remove the processing margin, then performing an edge-casting process.

2. The edge-casting process for sheet materials according to claim 1, wherein an upper end of said first groove extends into an upper end of the main body to make an upper end of said first groove wider than a lower end of said first groove.

3. The edge-casting process for sheet materials according to claim 1, wherein a lower end of said second groove extends into a lower end of the main body to make a lower end of said second groove.

4. The edge-casting process for sheet materials according to claim 1, wherein in S2, after the high-solid content coating material is solidified, a surplus high-solid content coating material on the sheet material is sandpapered and flattened.

5. The edge-casting process for sheet materials according to claim 1, wherein in S3, after the high-solid content coating material is solidified, a surplus high-solid content coating material on the sheet material is sandpapered and flattened.

6. The edge-casting process for sheet materials according to claim 1, wherein the high-solid content coating material is unsaturated resin.

7. The edge-casting process for sheet materials according to claim 1, wherein the sheet material is a man-made board or solid wood board.

* * * * *